United States Patent [19]

O'Donnell, III

[11] 4,363,189
[45] Dec. 14, 1982

[54] TRANSPLANTABLE PLANTER

[76] Inventor: John T. O'Donnell, III, 1518 Crestwood Rd., Mayfield Heights, Ohio 44124

[21] Appl. No.: 164,299

[22] Filed: Jun. 30, 1980

[51] Int. Cl.³ .................................................. A01G 9/02
[52] U.S. Cl. .......................................... 47/73; 217/16; 47/85; 47/66
[58] Field of Search ................ 47/66, 73; 217/16, 48, 217/14

[56] References Cited

U.S. PATENT DOCUMENTS

| 94,202 | 8/1869 | Gustafson | 47/73 |
|---|---|---|---|
| 1,205,028 | 11/1916 | Rudolph | 47/66 |
| 2,332,652 | 10/1943 | MacKenzie | 217/16 |
| 2,594,307 | 4/1952 | Valenzuela | 47/73 |
| 3,391,848 | 7/1968 | Schmidt | 217/16 X |

FOREIGN PATENT DOCUMENTS

| 101435 | 7/1937 | Australia | 47/73 |
|---|---|---|---|
| 1319409 | 1/1963 | France | 47/73 |
| 404525 | 1/1934 | United Kingdom | 217/48 |

Primary Examiner—Robert E. Bagwill
Attorney, Agent, or Firm—James A. Hudak

[57] ABSTRACT

A planter (10) from which plants can be easily removed without inverting and shaking same is disclosed. The planter (10) is comprised of a base member (14), a plurality of side panels (12) surrounding the base member (14), a plurality of support blocks (20) attached to the side panels (12) to support the base member (14), and straps (16) attached to adjacent side panels (12). Because of this construction, removal of a plant from the planter (10) is accomplished by the selective removal of fasteners (18) from one side panel (12) allowing this side panel to be swung outwardly about the straps (16) permitting access to the plant.

In an alternate embodiment, a planter (40) has removable side panels (42) which are interconnected by means of dowel pins (48) received through adjacent side panels (42) and a connecting post (44) interposted therebetween. In still another embodiment, a seedling tray (30) having a plurality of compartments (32), each of which has a door (34) for access thereto, is disclosed.

2 Claims, 9 Drawing Figures

U.S. Patent     Dec. 14, 1982     4,363,189
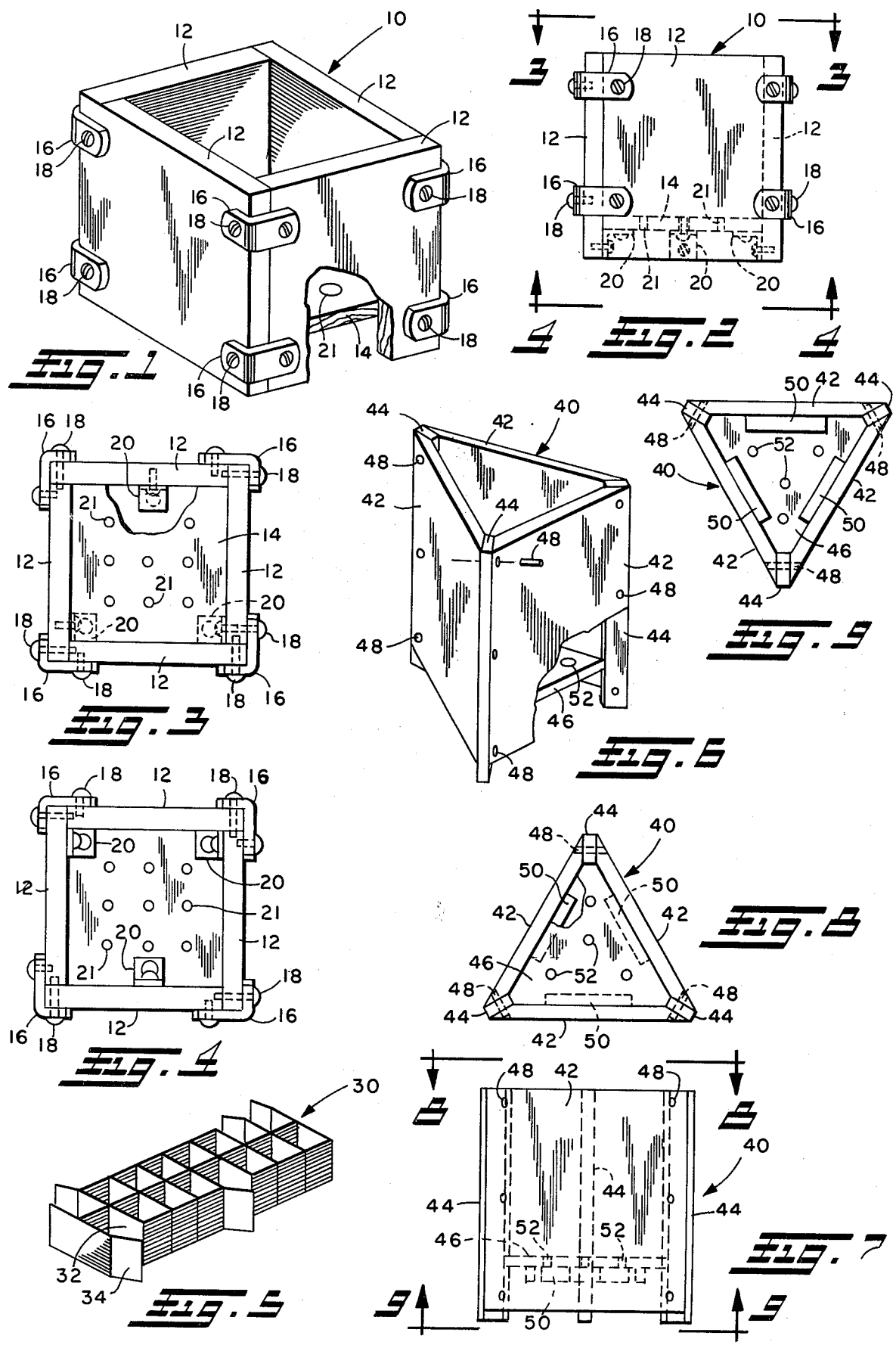

TRANSPLANTABLE PLANTER

TECHNICAL FIELD

The present invention relates generally to planters and more particularly to planters which can be easily disassembled to permit the removal of the plant for transplanting purposes.

BACKGROUND ART

Most planters are of the type which must be inverted and shaken to permit the removal of the plant contained therein. Such an inverting and shaking process sometimes results in the potting soil breaking away from the plant which can harm the root structure of the plant. In addition, additional labor is required to clean up the soil that has broken away.

The prior art planters that have means for removing the plant for transplanting purposes are generally round in configuration and are utilitarian rather than decorative in appearance. In addition, these planters utilize locking means that are relatively difficult to form, e.g., eyelets with a connecting rod therethrough, or which do not lock securely, e.g., interlocking flanges held together by the weight and compression of the soil in the planter.

Because of this it has become desirable to develop a transplantable planter that is simple to assemble and disassemble, is functional and yet decorative, and which uses construction techniques that can be used to form transplantable planters having a variety of geometric configurations.

SUMMARY OF THE INVENTION

The present invention solves the aforementioned problems associated with the prior art by providing a decorative transplantable planter which is simple to assemble and disassemble, and which utilizes construction techniques permitting the formation of planters in various geometric configurations. In one embodiment of the invention, the side panels of the planter are held together by fasteners and flexible straps which are selectively positioned on and attached to the side panels. To remove a plant from this planter, the straps adjacent one edge of a side panel are detached therefrom and the fasteners along the opposite edge of the same side panel are selectively withdrawn permitting the side panel to be swung outwardly about the straps on the opposite edge allowing access to the plant. In another embodiment of the invention, the side panels of the planter are held together by dowel pins driven through connecting posts interposed between adjacent side panels. To remove a plant from this planter, the dowel pins holding one of the side panels are driven through the panel into the adjacent connecting posts allowing the side panel to be removed from the remaining side panels and connecting posts permitting access to the plant. The last embodiment of the invention is directed to a tray arrangement having a plurality of compartments each of which could contain a seedling. Each of the compartments has a door attached to the tray. By opening the doors to the individual compartments, the seedlings can be selectively removed from the tray.

BRIEF DESCRIPTION OF THE DRAWINGS

FIG. 1 is a perspective view, partially broken away in cross-section, of an embodiment of the present invention.

FIG. 2 is a front elevation view of the invention illustrated in FIG. 1.

FIG. 3 is a top plan view of the invention taken along indicating lines 3—3 of FIG. 2.

FIG. 4 is a bottom plan view of the invention taken along indicating lines 4—4 of FIG. 2.

FIG. 5 is a perspective view of another embodiment of the invention.

FIG. 6 is a perspective view, partially broken away in cross-section, of another embodiment of the invention.

FIG. 7 is a front elevation view of the invention illustrated in FIG. 6.

FIG. 8 is a top plan view of the invention illustrated in FIG. 6.

FIG. 9 is a bottom plan view of the invention illustrated in FIG. 6.

DESCRIPTION OF THE PREFERRED EMBODIMENT

Referring now to the drawings wherein the illustrations are for the purpose of describing the preferred embodiment of the invention and are not intended to limit the invention hereto, FIG. 1 shows a perspective view of a decorative transplantable planter 10 which is comprised of side panels 12 and a base member 14. A four-sided planter is shown, however, it is understood that the type of construction utilized for such a planter and hereinafter described can be used for a variety of planters each having a different number of sides resulting in different planter configurations.

The side panels 12 are generally formed from wood, such as redwood, or are molded from a moldable plastic material. In any event, the material utilized is generally relatively impervious to weathering and to dampness typically associated with potting soil. Also, the overall size of the side panels 12 for each planter is usually the same. The resulting side panels 12 are placed in a configuration with their ends in an abutting relationship to form a geometric shape, such as the square shape shown in FIG. 1, however, as previously mentioned, different configurations can be formed by using various numbers of side panels 12.

The side panels 12 are held together by fasteners 18 that are received through straps 16 which are generally placed in a spaced-apart relationship near the vertical edges of the side panels 12. A fastener 18 is received through each end of each strap 16 and is threaded into the side panels 12 so that one fastener 18 in each strap 16 also engages the adjacent side panel 12 to provide support to the resulting construction. The straps 16 are formed from a flexible material such as leather or a plastic material. Generally, two straps are used to attach two adjacent side panels 12, however, a single strap or a plurality of straps can be used.

The base member 14 is received within the opening formed by the side panels 12 when assembled in the desired geometric configuration and held together by the fasteners 18 and the straps 16. A plurality of apertures 21 is provided in the base member 14 in order to allow for drainage from the planter 10. The overall size of the base member 14 is slightly less than the inside dimensions of the geometric configuration formed by the side panels 12 when assembled. The base member 14 is generally formed from wood or moldable plastic and is supported within the geometric configuration formed by the side panels by means of support blocks 20 or brackets which are positioned on and attached to the side panels 12, as shown in FIG. 4. By positioning the support blocks 20 as illustrated, a minimum number of blocks is required to support the base member 14. It should be noted that one of the side panels 12 does not have a support block 20 attached thereto. This permits that particular side panel to be opened and swung about one set of straps attached thereto permitting the removal of the plant from the planter 10.

To remove a plant from the planter 10, the straps 16 along one edge of the side panel 12 that does not have a support block 20 attached thereto are detached from this panel by withdrawing a fastener 18 in each of the straps 16. The fasteners 18 which threadably engage the opposite edge of this panel and its adjacent abutting panel 12 are then withdrawn freeing the panel 12 permitting it to be swung about the set of straps 16 along its opposite edge, opening the planter 10 allowing the removal of the plant, with the soil intact, therefrom. Thus, the plant and soil can be easily removed from the planter 10 without inverting the planter which could result in the soil breaking away from the plant and possible damage to the root structure of the plant.

It should be noted that since the straps are flexible, the planter 10 can be readily collapsed and folded for storage. This is accomplished by removing all of the fasteners 18 from the straps 16 on one side panel 12 and withdrawing all of the other fasteners 18 that threadably engage more than one side panel. After removal and withdrawal of these fasteners 18, the remaining side panels 12 can be folded on themselves resulting in a very compact stack of components for storage or shipping.

An alternate embodiment of this invention is illustrated in FIG. 5 which shows a plant seedling tray 30 having a plurality of compartments 32 formed therein. The tray 30 is generally molded from a moldable plastic material. Each of the compartments 32 is provided with a door 34 which is attached to the tray 30 and which can be opened for removal of the seedling with the soil surrounding same. In this manner, the seedling can be removed from the tray 30 without inverting same which could result in the soil breaking away from the seedling being removed or from other seedlings in the tray.

A still another embodiment of the invention is shown in FIG. 6 which illustrates a decorative transplantable planter 40 comprised of side panels 42, connecting posts 44, and a base member 46. Here again, these components are generally formed from wood or molded from a moldable plastic material. The side panels 42 are held together by fasteners, such as dowel pins 48, which are received through apertures provided in the side panels 42 and the connecting post 44 which are interposed between each pair of adjacent side panels 42. A plurality of apertures 52 is provided in the base member 46 in order to provide for drainage from the planter 10. The base member 46 has a configuration similar to but slightly smaller than the configuration formed by the side panels 42 when interconnected. The base member 46 is received in the opening formed by the side panels 42 and is supported therein by a support block 50 attached to each of the side panels 42. As in the first embodiment of the invention, this same type of construction can be used to form planters having various configurations by utilizing a different number of side panels 42.

To remove a plant from the planter 40, the dowel pins 48 in one side panel 42 are pushed into the adjacent connecting posts 44 allowing the side panel 42 to be removed without disturbing the remaining side panels or connecting posts. After the side panel has been removed, the plant with its soil intact can be removed from the planter 40. To reassemble the planter 40, the side panel 42 that has been removed is positioned against the connecting posts 44 to which it will be attached so that the respective apertures therein are aligned and the dowel pins 48 are driven into the side panel. Thus, opening and closing the planter 40 is a relatively simple task.

Certain modifications and improvements will occur to those skilled in the art upon reading the foregoing. It should be understood that all such modifications and improvements have been deleted herein for the sake of conciseness and readability but are properly within the scope of the following claims.

I claim:

1. A planter apparatus comprised of a base member, a plurality of side members arranged in a surrounding relationship to said base member, each of said side members being substantially perpendicular to said base member, means for supporting said base member attached to all but one said side member, and means for attaching adjacent side members together, said attaching means comprising flexible straps connected to said adjacent side members, said flexible straps being selectively detachable from said adjacent side members permitting said one side member to be swung outwardly with respect to said planter apparatus allowing the removal of a plant contained within said apparatus without inversion thereof.

2. The apparatus as defined in claim 1 further including one or more apertures in said base member permitting drainage from said planter apparatus.

* * * * *